AFC DISABLING SYSTEM OPERATIVE BY REDUCING THE D.C. DISCRIMINATOR OUTPUT TO ZERO

Filed Oct. 29, 1963 2 Sheets-Sheet 1

INVENTORS
HUGH H. DAVIDS
W. R. LAITINEN
BY I. David Blumenfeld
ATTORNEY

INVENTORS
HUGH H. DAVIDS
W. R. LAITINEN

BY I David Blumenfeld

ATTORNEY 3,343,092

AFC DISABLING SYSTEM OPERATIVE BY REDUCING THE D.C. DISCRIMINATOR OUTPUT TO ZERO

Hugh H. Davids, Lynchburg, Va., and William R. Laitinen, Minneapolis, Minn., assignors to General Electric Company, a corporation of New York Filed Oct. 29, 1963, Ser. No. 319,881
4 Claims. (Cl. 325—346)

This invention relates generally to radio receivers with automatic frequency control (AFC) and, more particularly, to an arrangement for limiting the operational range of the AFC by disabling the system whenever the predetermined operational range is exceeded.

The use of automatic frequency control (AFC) circuits in radio receivers serves to maintain the receiver tuned to the proper frequency by controlling the local oscillator of the receiver in such a manner as to maintain the intermediate frequency (I.F.) signal centered at a predetermined frequency $F_O$. If the I.F. signal is not at $F_O$, due to changes in the receiver local oscillator frequency $F_{LO}$ or frequency shifts in the incoming signal $F_O$, a D.C. error voltage is produced at the output of a frequency discriminator. The magnitude of the error voltage varies with the degree of the frequency departure from $F_O$, and the polarity with the direction of departure (i.e., whether the frequency of the I.F. signal is below or above $F_O$. The D.C. error voltage is fed back to the frequency determining circuit of the receiver local oscillator to vary the local oscillator frequency $F_{LO}$ in a direction to maintain the I.F. signal frequency centered at $F_O$.

Angular modulation receivers (where the term angular modulation includes both frequency and phase modulation) are subject to interference from unwanted adjacent channel signals which may cause the AFC system and the receiver to lock onto and receive the unwanted signal. The problem is particularly acute in two-way mobile communication because the frequency separation between channels, as established by the Federal Communications Commission, is only fifteen (15) kilocycles (kc.) The nature and magnitude of this problem may be more clearly understood by briefly considering the intrinsic characteristics of angularly modulated receivers. When two angularly modulated transmitters, located within range of a receiver, are operated on the same frequency, or are separated by a relatively small frequency difference, the stronger signal tends to suppress the weaker one. The suppression is almost complete if the amplitude of the stronger signal is at least twice that of the weaker. Even if the signal strength ratio is less than two (2) and is, in fact, closer to unity, the suppression effect is quite pronounced. This phenomenon of the stronger signal suppressing the weaker is sometimes referred to as the "capture effect" or as "F–M capture," although the effect is present both in frequency and phase modulation systems. Thus, if the adjacent channel signal is, for any reason, stronger than the desired channel signal, as would be the case, for example, if a given mobile receiver is geographically closer to the adjacent channel transmitter than to its own transmitter or if propagation phenomena enhance the undesired signal, the strong adjacent channel signal causes the Automatic Frequency Control Circuit to hunt and shift the local oscillator frequency.

As the local oscillator frequency is shifted in the direction of the unwanted signal, the Intermediate Frequency signal produced by mixing or heterodyning the unwanted adjacent channel signal with the local oscillator signal $F_{LO}^1$ approaches the predetermined midband frequency $F_O$ for which the receiver is designed. That is, the I.F. stages and their associated filters are designed to have their passband center at $F_O$. Although these filters are designed to have the narrowest passband and the sharpest skirt selectivity possible in order to attenuate frequencies outside of the desired band completely, the finite capabilities of filters are such that some of this energy outside of the desired passband gets through. That is, the ideal bandpass filter would provide infinite attenuation of the signal at the two cutoff frequencies of the filter. The response curve of such an ideal filter (frequency plotted along the abscissa and transmission or output along the ordinate) would show infinite slope at the cutoff frequencies, i.e., vertical "skirts." However, realizable filter constructions are, for practical purposes, incapable of achieving infinite signal attenuation at the cutoff frequencies so that the curve has finite slope beyond the cutoff frequencies. This, of course, means that some energy outside of the desired passband, although attenuated, will get through. This shifts the local oscillator frequency further in the direction of the unwanted signal until the receiver is either detuned or actually locked onto the undesired adjacent channel signal.

Hitherto, attempts have been made to solve this problem by limiting or "leashing" the discriminator output to prevent the AFC error voltage, and, hence, the frequency excursion of the local oscillator, from exceeding a predetermined value. Typically, such prior art schemes contemplate coupling a diode limiter, or the like, to the discriminator in the AFC Circuit. The limiter diodes are normally reverse-biased and do not affect operation of the AFC Circuit as long as the discriminator output voltage is less than a predetermined value as established by the reverse-biasing voltage on the diodes. If the discriminator voltage exceeds the predetermined value, the diodes conduct, thereby limiting the error voltage and limiting the frequency excursion of the local oscillator and of the receiver.

While this arrangement is to some degree useful in preventing the receiver from locking onto the undesired adjacent channel signal, it does have definite limitations. Even though the degree of local oscillator frequency excursion is limited, the local oscillator is still shifted in frequency toward the adjacent channel signal to a degree determined by the effect of the limited error signal on the local oscillator. With extremely narrow frequency separation between channels (15 kc. in the case of two-way mobile equipment), even a limited shift of the local oscillator frequency may produce an I.F. signal by heterodyning the adjacent channel signal and the local oscillator which falls within the passband of the I.F. filters thus maintaining the local oscillator at the shifted frequency. This, of course, produces interference and makes it more difficult for the proper channel signal to "recapture" the receiver.

In the present invention the disadvantages of prior art systems are overcome and provision is made for limiting the operational range of the automatic frequency control by disabling the AFC circuitry to prevent a signal outside a desired frequency range from actuating it.

Accordingly, it is an object of this invention to provide an improved automatic frequency control disabling system which prevents a signal outside the desired frequency range from actuating the automatic frequency control circuit.

A further object of this invention is to provide a receiver having automatic frequency control circuitry in which the operating range of the automatic frequency control circuitry is limited to a predetermined range of frequencies.

Another object of this invention is to provide an improved automatic frequency control disabling system which prevents actuation of the automatic frequency control circuit by adjacent channel signals.

Yet another object of this invention is to provide an automatic frequency disabling system which prevents the automatic frequency control circuit from hunting and locking onto undesired signals.

In one illustrative embodiment of this invention the above objectives are realized, and the operational range of the automatic frequency control circuit is limited by disabling the automatic frequency control circuit if the frequency departure of the signal exceeds a predetermined operating range. When the frequency departure exceeds the desired operational range so that the output error voltage of the discriminator exceeds a predetermined value, an appropriate disabling circuit is actuated which removes the error voltage from the oscillator control circuit as, for example, by inserting a fixed voltage which opposes and cancels the discriminator output voltage. Thus, the AFC circuit is effective only within the desired frequency range, and a very strong signal outside the range cannot actuate the AFC.

The features of this invention, which are believed to be novel, are set forth with particularity in the appended claims. The invention itself, however, both as to its organization and method of operation, together with further objects and advantages thereof, may best be understood by reference to the following description taken in connection with the accompanying drawings in which:

Figure 1:
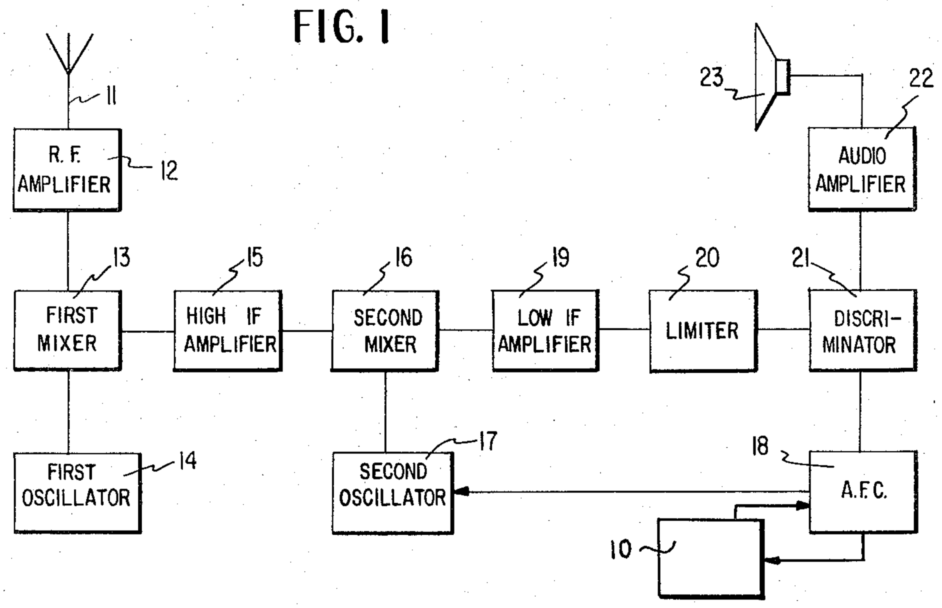
FIG. 1 is a block diagram of a frequency-modulation receiver incorporating an automatic frequency control circuit.

FIG. 1 illustrates, in block diagram form, an angular modulation receiver incorporating such an AFC disabling circuit. A frequency or phase modulated signal from a remote transmitter is picked up by receiving antenna 11 and fed to the input of a radio frequency (RF) amplifier 12. The received signal undergoes frequency translation by heterodyning or mixing the amplified RF signal in a first mixer 13 with the output signal from a first local oscillator 14 to produce a high intermediate frequency (high I.F.) signal. The high I.F. signal is amplified in high I.F. amplifier 15, the output of which is fed to a second mixer 16. The amplified high I.F. signal is heterodyned in mixer 16 with the signal from a second local oscillator 17, which is controlled by the automatic frequency control circuit 18, to produce a low intermediate frequency (low I.F.) signal. The low I.F. signal is amplified in one or more low I.F. amplifier stages 19 and is then applied to limiter 20 to remove any amplitude modulations due to noise or other factors. The limited output is coupled to discriminator 21 which recovers the audio signal and also produces the automatic frequency control (AFC) error voltages. The audio signal is fed to a conventional audio amplifier 22 which may include one or more audio and power amplifier stages to drive the sound reproducer or speaker 23.

The AFC system 18 forms part of a feedback loop for controlling the frequency of the second local oscillator and includes a disabling network 10 which limits its operational range. The disabling system, as will be described in detail presently, impresses a fixed bias on network 18 which cancels the error signal output from the discriminator 21 whenever a signal is received which is outside of the desired operating range. The AFC loop is thus disabled, and the second local oscillator frequency is shifted back to its normal value. A strong adjacent channel signal thus cannot "capture" the AFC circuit and shift the local oscillator frequency sufficiently to detune the receiver or lock it onto the undesired adjacent channel signal.

The output of the discriminator 21 may also be used to feed a noise amplifier and rectifier to provide a signal for a squelch circuit (not shown) which serves to deenergize or cut off the audio amplifier 22 when no signal is present. If a signal is present, the limiter 20 is arranged to render the squelch circuit inoperative, allowing the audio amplifier 22 to operate normally. Such "squelch" or "muting" circuits are old and well known and are, therefore, not illustrated though it will be understood that they may be used in the receiver of FIG. 1.

Figure 2:
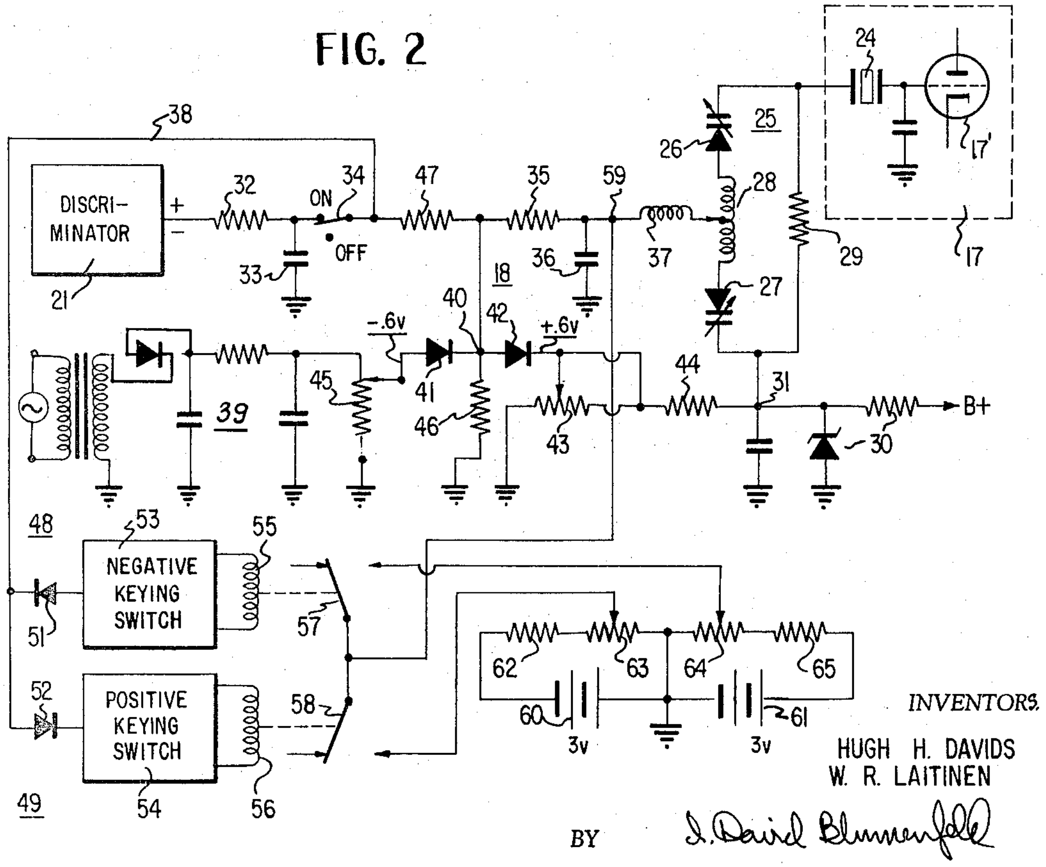
FIG. 2 is a schematic representation of the automatic frequency control disabling system of the invention.

FIG. 2 is a detailed showing of the AFC and AFC disabling system of this invention. The second local oscillator 17, which is controlled by the AFC system, is shown as a crystal controlled oscillator having a frequency determining crystal 24 connected in the grid circuit of the oscillator. The crystal oscillator may be one of many well known types, and a partial showing is adequate for purposes of this description. The crystal frequency and, hence, the oscillator frequency may be varied by varying a reactance, and preferably a capacitive reactance, connected in series with the crystal. To this end a frequency controlling network 25, which is responsive to the AFC voltage, is coupled to the oscillator. Network 25 consists of two parallel branches, one branch consisting of two voltage variable capacitive reactances 26, 27 connected in series with center tapped inductance 28, and the other branch consisting of a grid leak resistor 29.

The nonlinear reactance elements employed for this purpose are solid state, voltage-sensitive, semiconductor capacitors which are commonly referred to as "varactors" or "varicaps." Varactors are zero or reverse-biased PN diodes characterized by the fact that a region of depleted mobile charge carriers exist at either side of the junction. This region or layer, which is sometimes referred to as "depletion layer," is bounded on either side by the P and the N type materials. The PN diode, therefore, effectively constitutes a capacitance since it represents an insulator, substantially free from charge carriers, bounded by conducting or semiconducting layers on either side. The width of the depletion layer, and hence the capacitance of the device, varies inversely with the applied voltage, and application of a variable voltage across the PN diode results in a variation in the capacitance of the device. Varactors 26 and 27 are reverse-biased by impressing a fixed bias voltage at the junction 31 of varactor 27 and resistor 29, thereby establishing the nominal or reference value of capacitance. Junction 31 is connected to a source of biasing voltage indicated at B+ through a suitable resistor and is maintained at a constant bias level by voltage reference element such as a Zener diode 30.

The D.C. voltage from discriminator 21 is applied to the center tap of inductance 28 through a first RC audio filter network, comprising resistor 32 and capacitor 33, switch 34, a second RC audio filter network, comprising resistor 35 and capacitor 36, isolating resistor 47, and a choke 37. The polarity (+ or −) of the error voltage depends, as is well known, on the direction of the frequency departure from the I.F. midband or center frequency $F_O$. The error voltage, therefore, either adds to or is subtracted from the varactor biasing voltage, thereby varying the capacitance of the varactors and shifting the oscillator frequency in the proper direction. In order to limit the error voltage, which can be impressed on frequency controlling network 25, the discriminator output is also coupled to a double diode limiter through voltage dropping resistor 47 and resistor 46 connected between junction 40 of the limiter and ground. The limiter includes diodes 41 and 42 connected in series between two bias voltage sources of opposite polarity. The polarity of the biasing voltages are such that under normal conditions the diodes are reverse-biased and in the nonconducting state. Thus, the cathode of diode 42 is maintained more positive than the anode by connecting the cathode to the wiper of variable resistor 43 which is, in turn, coupled through resistors 44 and 30 to the positive terminal B+ of a source of positive biasing voltage. Similarly, the anode of diode 41 is maintained more negative than the cathode by connecting the cathode to the movable wiper of variable resistor 45 which is, in turn, connected to a negative D.C. potential source 39. Potential source 39 includes an A.C. source, a half-wave rectifier for rectifying only the negative alternations of the A.C. voltage, and a fifilter to by-pass the A.C. ripple to ground. Reference biasing voltages of opposite polarity for the diodes 41 and 42 are thus established, respectively, across variable resistors 45 and 43.

These reference voltages may, as shown in FIG. 2, be equal and on the order of approximately six-tenths ($6/10$) of a volt. The actual value of the limiting voltage level is established by the characteristic of the frequency sensitive circuit 25 of the crystal oscillator. That is, the voltage sensitive varactors 26 and 27 establish the actual values of the limiting voltage for the double diode limiter. Furthermore, it will be understood that the positive and negative diode biasing voltages do not necessarily have to be equal. Again, the relative values of these voltages are established by the capacitance-voltage characteristics of varactors 26 and 27. As is well known, the voltage-capacity variations of varactors are not linear. Therefore, the voltages required to produce equal capacity variations about the nominal capacity are not necessarily the same. Consequently, the limiting levels of the diodes are not necessarily equal, and are established to correspond to the particular characteristics of the varactors and the normal biasing point of the varactors.

As the discriminator direct voltage output, which appears across resistor 46, varies in response to departures of the I.F. frequency from $F_O$, the diodes remain in the nonconducting states as long as the discriminator output voltage appearing across resistor 46 does not exceed the reverse-bias reference voltage. Whenever the discriminator voltage exceeds the diode reference voltage, one of the diodes conducts and prevents any further increase in the voltage applied to frequency controlling network 25. For example, if the discriminator voltage is negative and exceeds the reference voltage across resistor 45, corresponding to a high frequency condition, the cathode of diode 41 becomes more negative than the anode, and the diode 41 conducts. This limits the negative voltage which can be applied to the frequency control circuit to the level of the diode bias voltage and, therefore, limits the frequency shift that can be induced in the local oscillator. Similarly, if the discriminator voltage is positive and exceeds the reference level established across resistor 43, diode 42 conducts and limits the local oscillator frequency shift in the other direction.

The limiting arrangement is conventional and does not effectively prevent an interfering signal outside of the desired frequency range from actuating the automatic frequency control circuit to the maximum extent permitted by the limiting diodes. This will result in the receiver local oscillator being shifted from frequency $F_{LO}$ in one or the other directions to the maximum extent possible for the particular oscillator. This means that the receiver is detuned from the desired channel signal, and the desired signal is impaired and distorted. In order to counteract this difficulty, an AFC Disabling System is provided which positively disables the Automatic Frequency Control Circuit and returns the local oscillator to its nominal frequency $F_{LO}$ whenever the frequency departure of the local oscillator and the I.F. signal exceeds the predetermined range of values. This serves to prevent a signal outside of the desired range from actuating the automatic frequency control circuit.

This AFC disabling system includes both a positive disabling circuit 49 and a negative disabling circuit 48 which respond, respectively, to the positive and negative discriminator voltages. The output from discriminator 21 is coupled over lead 38 and a pair of diodes 51 and 52 to negative keying switch 53 and positive keying switch 54. It will be noted that the voltages applied to the disabling circuits for actuating the keying switches are, by virtue of the dropping resistor 47 in the AFC path, substantially larger than the voltages applied to the crystal oscillator frequency controlling circuit 25 and to the double diode limiter. This, it will be apparent to those skilled in the art, is necessary since the voltage required to cover the operating range of the double diode limiter and the frequency controlling circuitry may be substantially less than triggering or switching voltages for the keying switches. Hence, the voltage dropping resistor 47 is inserted between the double diode limiter junction point 40 and lead 38 so that the voltage on lead 38 is always greater than the voltage applied to the diode limiter by a fixed amount.

Figure 4:
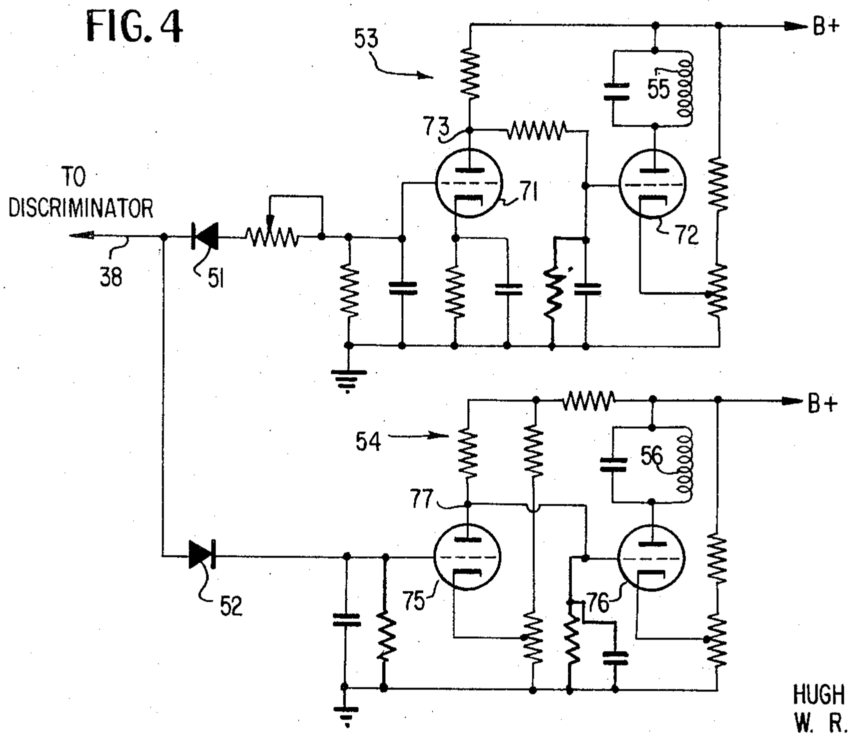
FIG. 4 is a schematic representation of the negative and positive keying disabling circuits illustrated in block form in FIG. 2.

Diode 51 is so poled that only negative signals actuate negative keying switch 53 while diode 52 is so poled that only positive signals actuate the positive keying switch 54. The keying switches, which may be of any suitable construction, and which will be discussed presently in connection with FIG. 4, are actuated only if the output signals are of the proper polarity and exceed a predetermined level. If the output of discriminator 21 exceeds this predetermined level, the appropriate disabling circuit is energized to insert a suitable "bucking" or cancelling voltage into the AFC network.

Negative keying switch 53, when actuated by a negative discriminator, energizes relay 55 and causes its armature 57 to connect a positive "bucking" or cancelling voltage to point 59 in the AFC loop which is equal to or substantially equal to the discriminator voltage at this point. Point 59 is connected to choke 28 forming part of the crystal oscillator frequency control circuit so that the positive bias voltage thus applied cancels the negative discriminator voltage, and the local oscillator frequency returns to its nominal value. Similarly, positive keying switch 54, when actuated by a positive discriminator voltage, energizes relay 56 and causes armature 58 to connect a negative "bucking" or cancelling voltage to point 59, again cancelling out the discriminator voltage applied to the network. Point 59 is isolated from junction 40 of diodes 41 and 42 by resistor 35 so that injection of the cancelling or "bucking" bias voltage does not cancel the discriminator voltage to the double diode limiter and partially cancel the discriminator output to the negative and positive disabling circuits 48 and 49.

The cancellation or "bucking" voltage is supplied from a suitable source which includes a pair of batteries 60 and 61, serially connected and grounded at their junction. The batteries 60 and 61 are respectively shunted by voltage dividing resistors 62, 63, 64, and 65. When relay 56 is energized its armature engages a contact connected to a movable wiper on resistor 63 while the armature of relay 55, when actuated, engages a contact connected to a movable wiper on variable resistor 64 to provide the negative and positive "bucking" voltages, respectively. The cancellation or "bucking" voltage applied to point 59 may be any appropriate value and is not limited to the bias voltage of the limiting diodes and may be adjusted by means of the movable wipers to any desired value. Nor need the positive or negative "bucking" voltages be equal since, as pointed out previously, the capacitance voltage characteristics of the varactors 26 and 27 will, to a large extent, govern the relative magnitude of these positive and negative voltages. However, it will be appreciated that the instant invention is not limited to any particular relationship of "bucking" voltages but embraces the broad concept of injecting 'bucking" voltages of the proper polarity and magnitude to cancel out the discriminator output or error voltage applied to the frequency controlling circuit or network of the local oscillator.

The negative and positive keying switch circuits which energize relays 55 and 56 may take any one of a number of different and conventional forms. For purposes of illustration, and without in any way limiting the invention thereto, one form of such switch circuits is illustrated in FIG. 4 and comprises a pair of two stage switches having a relay coil in the anode circuit of the second stage of each switch. Negative keying switch 53 includes a normally conducting triode 71, the anode of which is directly coupled to the grid of normally nonconducting triode 72. These initial conditions for triode 71 and triode 72 are established by adjusting the cathode self-biasing conditions so the grid bias on triode 72 is sufficient to drive it to cutoff, and the grid bias on triode 71 maintains it in the conducting state. The coil of relay 55 is connected in the anode circuit of triode 72 and thus is in the normally de-energized condition. The appearance of a negative discriminator voltage on discriminator lead 38 causes diode 51 to conduct. Whenever this negative voltage exceeds a predetermined value triode 71 is biased to cut off and rendered nonconductive. As triode 71 becomes nonconductive the voltage drop across its anode resistor is reduced, and the potential at anode 73 rises substantially. The positive going potential at point 73 is coupled directly to the control grid of normally nonconducting tube 72 and overcomes the negative grid bias driving the tube into conduction. Conduction of triode 72 produces sufficient anode current to energize relay coil 55 causing its associated armature, not shown, to be actuated and impresses a suitable "bucking" voltage on the automatic frequency control circuit.

Similarly, the appearance of a positive discriminator valtage on lead 38 actuates positive keying switch 54 to impress a "bucking" voltage of the opposite polarity into the automatic frequency discriminator circuit. The positive keying switch 54 includes a normally nonconducting triode 75, the anode of which is coupled directly to the control grid of a normally conducting triode 76. Relay coil 56 is connected in the anode circuit of triode 76 and is thus normally in the energized state. The initial biasing conditions for triode 75 and 76 are so arranged that triode 75 is nonconducting and triode 76 is conducting. To this end, the cathodes of the triode are connected to suitable voltage dividing networks so that the cathode of triode 75 is more positive than its control grid by an amount sufficient to bias it to cutoff. Triode 76, on the other hand, is not biased to cutoff. Hence, triode 76 is in a conducting state, and relay 56 is energized. A positive discriminator voltage on lead 38 causes diode 52, connected in the grid circuit of triode 75, to conduct and impress a positive voltage across the grid leak resistor of triode 75. Whenever this positive voltage exceeds a predetermined value, it reduces the negative bias on the control grid sufficiently to drive triode 75 into conduction. Whenever triode 75 conducts the voltage drop across its anode resistor increases substantially so that the potential of anode 77 drops. This negative-going voltage at the anode 77 is coupled directly to the control grid of triode 76 and drives the triode into the nonconducting state and deenergizes relay coil 56. The armature of relay 56, not shown, is switched and connects a negative "bucking" voltage to the AFC circuit.

Energization of relay 55, or the deenergization of relay 56, thus connects a "bucking" voltage of the proper polarity to the automatic frequency control circuit to cancel out the discriminator voltage applied to the frequency controlling circuit of the oscillator, thereby effectively disabling the automatic frequency control circuit.

Figure 3:
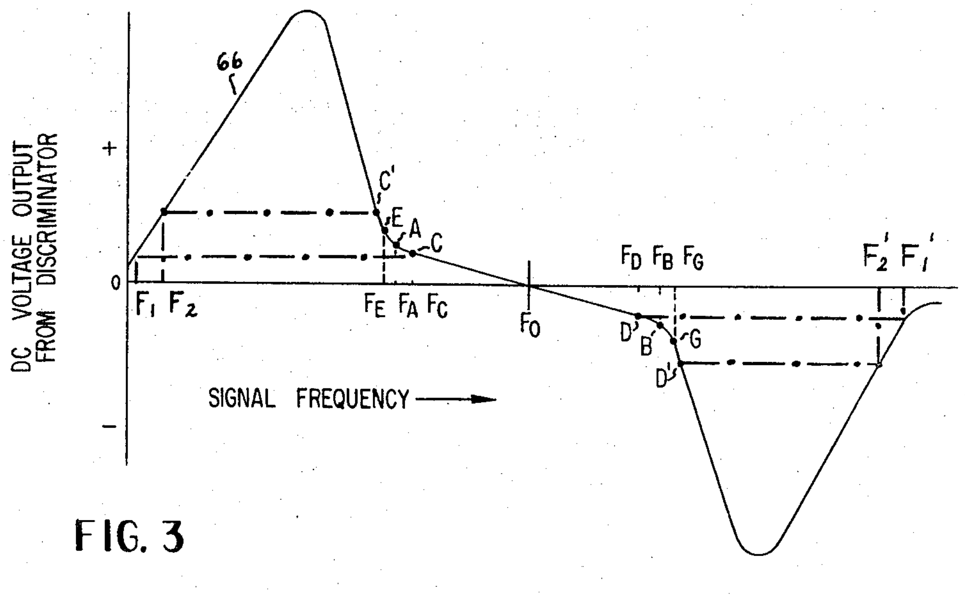
FIG. 3 is a graphical representation of the output voltage of the discriminator illustrating the preselected limiting points of the automatic frequency control disabling system of the invention.

The operation of the AFC disabling circuit may be most readily understood in connection with FIG. 3 which illustrates the voltage frequency characteristics curve of the discriminator when modified both by the double diode limiting circuit and the disabling circuit. In the graph of FIG. 3 curve 66 represents the modified characteristics of the discriminator forming part of the AFC loop. Curve 66 thus shows the characteristic operation with the frequency plotted along the abscissa and the D.C. output voltage from the discriminator applied to the local oscillator along the ordinate. $F_O$ Represents the center frequency of the discriminator and the midband frequency of the low I.F. stages of the receiver, and, as may be noted, the discriminator output is zero if the I.F. signal impressed on the discriminator is at frequency $F_O$. Points A and B on the discriminator curve 56 represent the maximum AFC control range in the sense that the particular oscillator has a finite range over which its frequency can be changed. Thus, in the curve, illustrated in FIG. 3, the particular oscillators are illustrated, for sake of example, as having a frequency excursion rang $F_A<F_O<F_B$. By adding the double diode limiting circuit, illustrated in FIG. 4, two output voltage limiting points are established, and in one case, let it be assumed that points C and B, representing $F_C$ and $F_D$, are these limiting points so that the discriminator output cannot exceed the voltage at points C and D. Even if the I.F. frequency lies beyond $F_C$ and $F_D$ the discriminator output is, in any event, limited to a maximum value represented by points C and D. However, this still means that frequencies as far displaced as $F_1$ and $F_1^1$ will produce a discriminator output of a magnitude sufficient to displace the local oscillator by an amount equal to $|F_O-F_C|$ or $|F_D-F_O|$ which either detunes the receiver or may even come close to locking it onto an adjacent channel signal.

However, by establishing two points E and G at which the disabling circuits are actuated, (i.e., the disabling point of the AFC circuit is set above the diode limiting level) any I.F. signal frequency beyond $F_E$ and $F_G$ actuates the disabling circuit to inject a "bucking" or cancelling voltage so that the discriminator output applied to the local oscillator goes to zero. The value of the capacitance in the crystal oscillator frequency controlling network also goes back to its nominal value, as does the oscillator frequency, thereby minimizing or completely counteracting the effects of the strong adjacent channel signals. If desired, the disabling of the AFC circuit may also be set at a point below the diode limiting level. That is, the diode limiting level may be set at a higher value as represented by the points $C^1$, $D^1$ on curve 66 in which event the disabling of the AFC will still occur at point E and D. Thus, whenever the frequency departure of the I.F. signal exceeds $F_E$ or $F_G$ the disabling circuits are actuated, inserting a "bucking" voltage into the AFC circuit, which reduces the discriminator output to the oscillator frequency controlling circuits to zero and returning the local oscillator frequency to its nominal value. It will be understood, therefore, that this arrangement for disabling the AFC circuit by the injection or insertion of a "bucking" or cancelling voltage in order to return the local oscillator frequency to its nominal frequency whenever the AFC circuit exceeds the desired operating range is extremely flexible in operation, and the actual points of limiting and disabling may be varied with the particular application.

It will also be understood that the invention is applicable to a receiver having a discriminator characteristic of opposite slope than the one shown in FIG. 3. Similarly, it will be understood that the inventive concept of reducing the discriminator output applied to the oscillator frequency controlling circuit to zero whenever the operative range is exceeded and thereby disabling the AFC may be achieved by an arrangement other than the insertion of a "bucking" and cancelling voltage. For example, actuation of the negative and positive disabling circuit and keying switches may be utilized to apply a suitable control signal to an amplifier which, in turn, operates a relay which removes the discriminator voltage from the automatic frequency control circuit whenever the desired limits are exceeded. In other words, there are many variations of the basic inventive concept of actuating a disabling circuit whenever the discriminator output exceeds a predetermined level, indicating that the frequency excursion has exceeded the desired range, and utilizing this disabling circuit to reduce the discriminator output voltage which is applied to the oscillator frequency controlling circuit to zero.

While a particular embodiment of this invention has been shown, it will, of course, be understood that it is not limited thereto since many modifications, both in the circuit arrangement and in the instrumentalities employed, may be made. It is contemplated by the appended claims to cover any such modification as forward in the true spirit and scope of this invention.

What is claimed as new and desired to be secured by Letters Patent of the United States is:

1. An angular modulation receiver having at least:

(a) one frequency translating stage for the received signal including a local oscillator at a nominal operating frequency and a mixer to produce the frequency translation of the received signal;

(b) an automatic frequency control circuit for said local oscillator including a frequency discriminator for producing a direct current output signal which is proportional to the departure of said translated signal from a predetermined frequency and frequency controlling means to control the local oscillator frequency in response to said direct current signal;

(c) means responsive to the direct current output signal from said discriminator for disabling said automatic frequency control circuit whenever the said discriminator output signal exceeds a predetermined value to return the local oscillator frequency to its nominal value including means to reduce the discriminator output signal impressed on the oscillator frequency controlling means to zero thereby to return the local oscillator frequency to its nominal value.

2. An angular modulation receiver having at least:

(a) one frequency translating stage for the received signal including a local oscillator at a nominal operating frequency and a mixer to produce the frequency translation of the received signal;

(b) an automatic frequency control circuit for said local oscillator including a frequency discriminator for producing a direct current output signal which is proportional to the departure of said translated signal from a predetermined frequency and frequency controlling means to control the local oscillator frequency in response to said direct current signal;

(c) means for disabling said automatic frequency control circuit whenever the said discriminator output signal exceeds a predetermined value to return the local oscillator frequency to its nominal value including, D.C. signal means, means responsive to said discriminator signal to impress a direct current signal from said signal means on said automatic frequency control circuit which opposes the direct current signal from said discriminator.

3. In an angular modulation receiver having an automatic frequency control circuit responsive to the discriminator output for maintaining the frequency of the local oscillator at the value required to produce the desired intermediate frequency, an automatic frequency control disabling system comprising:

(a) a first disabling circuit coupled to said discriminator and responsive to a negative D.C. output signal from said discriminator, said first disabling means being actuated whenever said negative output signal exceeds a predetermined value;

(b) a second disabling circuit connected to said discriminator and responsive to a positive D.C. output signal of said discriminator, said second disabling means being actuated whenever said positive output signal exceeds a predetermined value; and (c) means responsive to actuation of said first disabling circuit for applying a positive bias potential and means responsive to actuation of said second disabling circuit for applying a negative bias potential to said automatic frequency control circuit which opposes and cancels the discriminator output signal to the automatic frequency control circuit to prevent said automatic frequency control circuit from locking on an undesired signal.

4. In an angular modulation receiver having an automatic frequency control circuit responsive to the discriminator output for maintaining the frequency of the local oscillator at the value required to produce the desired intermediate frequency, an automatic frequency control disabling system comprising:

(a) a first disabling circuit connected to said discriminator responsive to a negative D.C. output signal of said discriminator exceeding a predetermined value;

(b) a second disabling circuit connected to said discriminator responsive to a positive D.C. output signal of said discriminator exceeding a predetermined value; and (c) means responsive to actuation of either said first or said second disabling circuit for applying a fixed bias potential having a value different from said predetermined values to said automatic frequency control circuit to prevent said automatic frequency control circuit from locking on an undesired signal.

References Cited

UNITED STATES PATENTS

| | | | |
|---|---|---|---|
| 2,510,906 | 6/1950 | Reid | 325—346 |
| 2,831,106 | 4/1958 | Clark | 325—346 |
| 2,844,713 | 7/1958 | Zuckerman | 325—346 |

KATHLEEN H. CLAFFY, *Primary Examiner.*

A. GESS, *Assistant Examiner.*